A. C. JOHNSON.
TRACTOR.
APPLICATION FILED FEB. 10, 1917.

1,253,833.

Patented Jan. 15, 1918.
2 SHEETS—SHEET 1.

Inventor
Alfred C. Johnson.

Witness
Charles Balg
Karl H. Butler

By
Attorneys

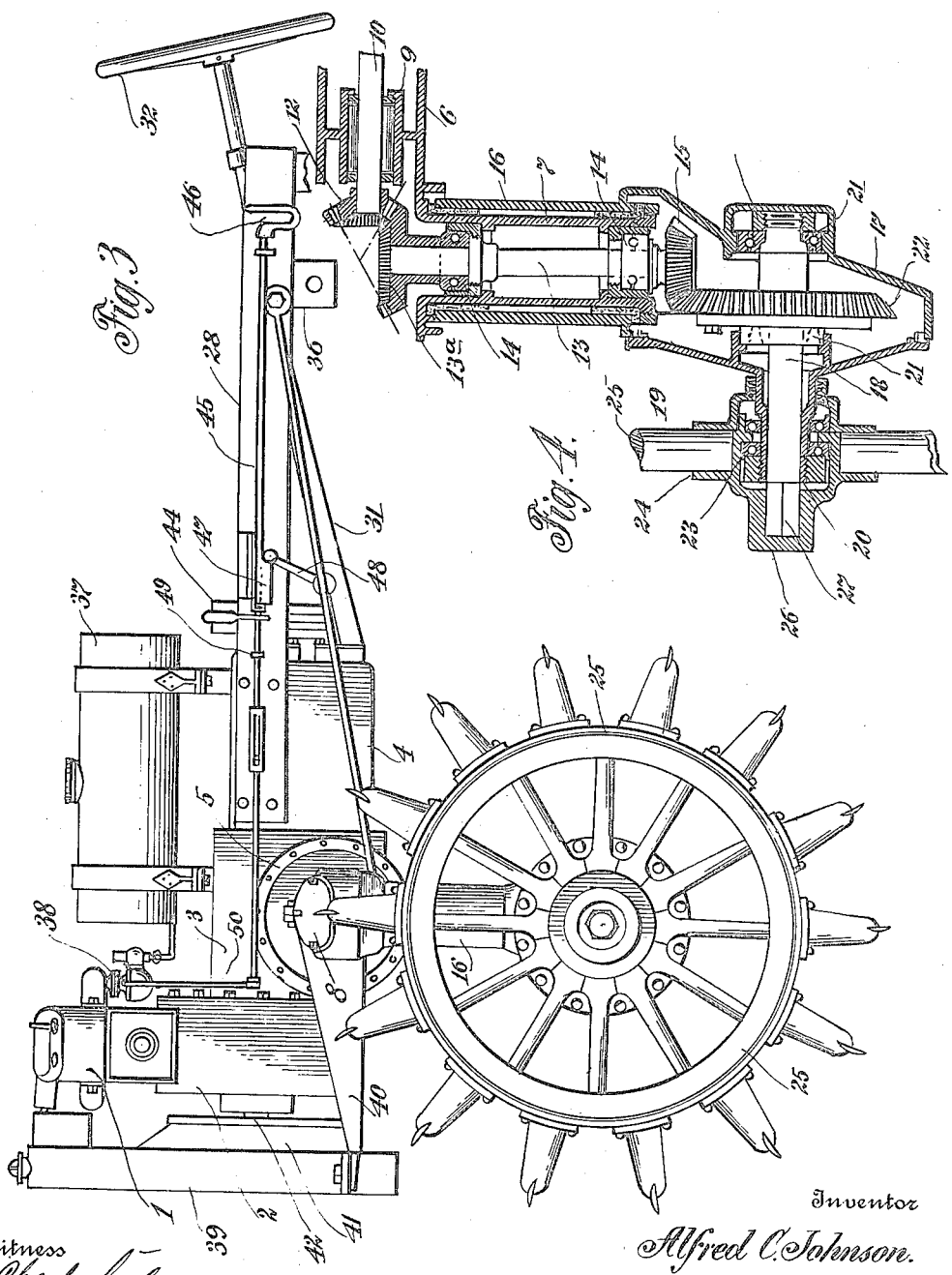

UNITED STATES PATENT OFFICE.

ALFRED C. JOHNSON, OF DETROIT, MICHIGAN.

TRACTOR.

1,253,833.　　　　　Specification of Letters Patent.　　Patented Jan. 15, 1918.

Application filed February 10, 1917. Serial No. 147,787.

*To all whom it may concern:*

Be it known that I, ALFRED C. JOHNSON, a citizen of the United States of America, residing at Detroit, in the county of Wayne and State of Michigan, have invented certain new and useful Improvements in Tractors, of which the following is a specification, reference being had to therein to the accompanying drawings.

This invention relates to tractors and more particularly to a vehicle that may be utilized as a pull-motor, propulsion device, attachment or power plant for another vehicle devoid of propulsion means. For instance, my machine has been especially designed for agricultural implements or machines and may be readily coupled thereto for moving the implements or machines about fields or on roads.

My invention aims to provide a machine of the above type that may be advantageously used in fields for moving cultivating implements or machines, the tractor being designed to afford sufficient clearance for growing plants, for instance corn, and it is in this connection that the tractor is equipped with novel wheels forming the subject matter of an application filed Jan. 22, 1917, Serial No. 143,769, and furthermore, has a balanced power plant centering the load on the traction wheel and relieving an agricultural implement attached to the tractor of any stresses or strains other than that incurred by drawing or pushing the implement over the ground.

My invention further aims to provide a tractor or pull-motor wherein the power plant is considerably elevated relative to the axles or spindles of the traction wheels, said wheels being arranged for steering purposes and to receive power from the power plant of the tractor or pull-motor. Novel means is employed for transmitting power from the engine or motor shaft to the traction wheels, said means including an angular drive that does not interfere with the steering of the traction wheels or subject said wheels to any lateral stresses or strains due to the power plant or the driven shaft therefor being located out of alinement with the axles or spindles of the traction wheels.

My invention further aims to provide a tractor or pull-motor with novel controlling devices that may be operated at a point remote from the power plant of the machine. One of the devices is employed for controlling the clutch and brake mechanism and carbureter, while another device is adapted for operating the change speed gear shifting mechanism. Both of these devices in connection with the tractor or pull-motor *per se* are in proximity to the steering wheel or column and permit of the operator of the machine readily controlling the same.

My invention further aims to accomplish the above results by a simple, compact, durable and efficient machine that will be hereinafter described and then claimed.

Reference will now be had to the drawings, wherein—

Fig. 3 is a side elevation of a tractor, and

Fig. 4 is an enlarged detail view of the power transmission mechanism for one of the traction wheels of the machine.

Figures 1, 2:
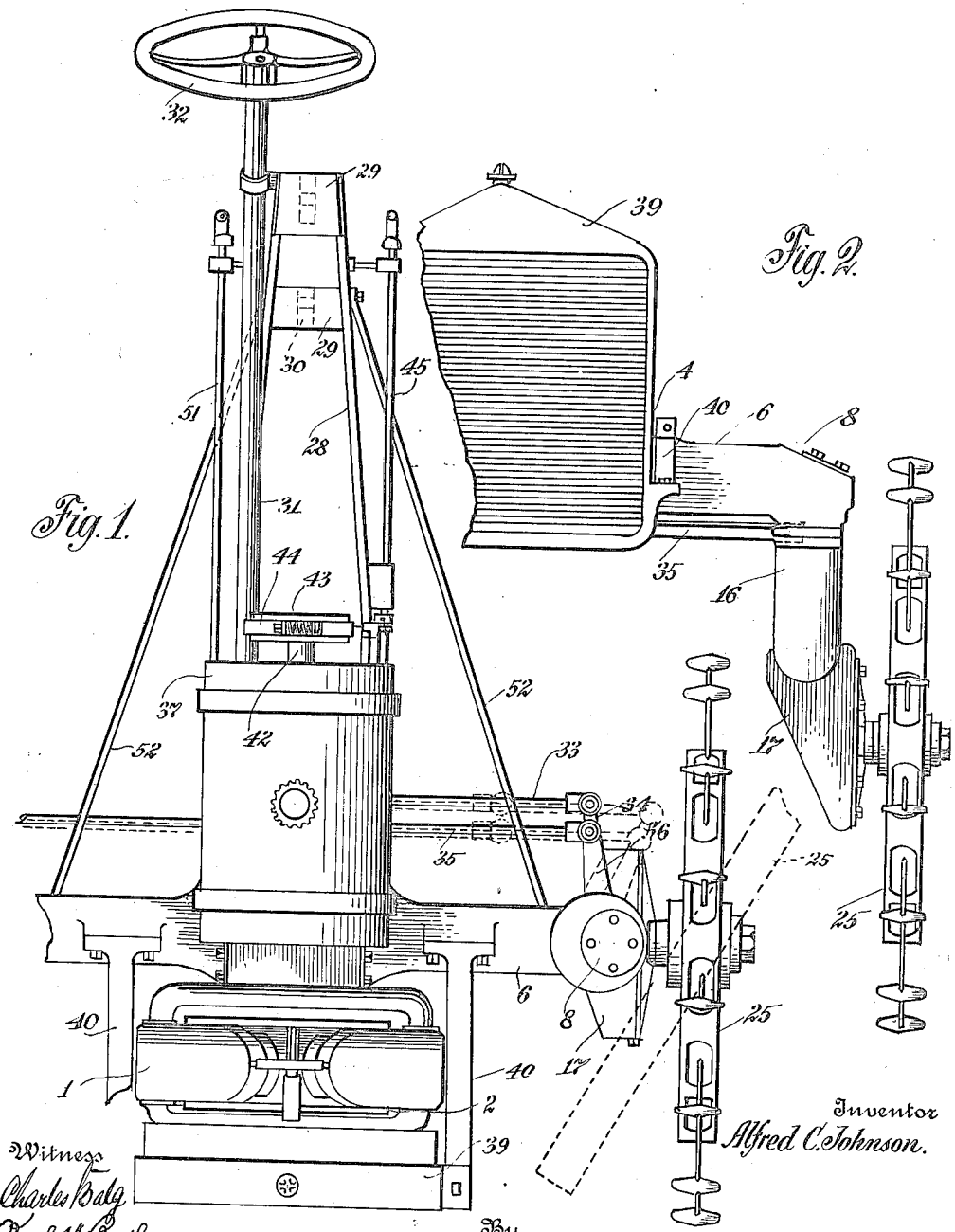
Figure 1 is a plan of a portion of the tractor.
Fig. 2 is a front elevation of a portion of the same.

In the drawings, 1 generally denotes an internal combustion engine having a crank case 2 and communicating therewith is a transmission casing 3 and a casing 4 containing the usual change speed gear mechanism.

Connected to the sides of the casing 3 and communicating therewith are the heads 5 of outwardly extending lateral arms 6, said arms being hollow with the outer ends thereof provided with depending tubular legs 7 and at the juncture of the arms 6 and the legs 7 are detachable plates 8 so that easy access can be had to the interior of the arms and legs.

Within the arms 6 are suitable anti-frictional bearings 9 for driven shafts 10, said shafts extending into the transmission casing 3 to be driven by the engine 1 through the usual change speed gear mechanism located within the casing 4. The outer ends of the shafts 10 are provided with gear wheels 12 meshing with gear wheels 13ᵃ on the upper ends of vertically disposed shafts 13 revoluble in the legs 7. As the legs 7 and parts associated therewith are identical at both sides of the machine, I deem it only necessary to describe the construction at one side of the machine, and reference will be had to Fig. 4, showing these parts in section. Within the leg 7 are suitable bearings 14 for the shaft 13 and the lower end of said shaft has a beveled gear wheel 15.

Rotatable on the leg 7 is a tubular knuckle member 16 having the lower end thereof provided with a housing 17 for a wheel axle or shaft 18. The housing 17 has a detachable outer face plate 19 providing a hub portion 20 for the wheel axle 18 and this wheel axle has the inner end thereof supported by anti-frictional bearings 21 within the housing 17. On the inner end of the wheel axle is a large beveled gear wheel 22 meshing with the beveled gear wheel 15 of the shaft 13. The hub portion 20 is provided with anti-frictional bearings 23 for the hub 24 of a wheel 25, and the hub 24 has a socket portion 26 into which extend the outer, rectangular or shank end of the wheel axle 18.

The casing 4 supports converging frames 28, connected as at 29, and provided with depending coupling members 30 so that the tractor may be attached to a vehicle. The frames 28 support an angularly disposed steering column 31 and this steering column has a steering wheel 32 and the usual connection to a rod 33, which is connected, as at 34, to a steering yoke 35. This steering yoke has crank portions 36 mounted on the upper end of the tubular knuckle members 16, thus permitting of the wheels 25 being turned in a desired direction for steering purposes.

On the casings 3 and 4 is a fuel tank 37 connected with a carbureter 38 of the engine 1. The engine 1 has the usual connections with a radiator 39 supported adjacent the engine 1 by brackets 40 of the arms 6, and between the radiator 39 and the crank case 2 of the engine 1 is a fan casing 41 containing the usual fan driven by the engine shaft 42 of the engine 1. The engine shaft 42 or a shaft driven thereby extends out of the casing 4, between the frames 28 and is provided with a brake wheel 43. A brake band 44 is in operable relation to the brake wheel 43 and is adapted to be operated by a controlling rod 45 supported from one of the frames 28. The controlling rod 45 is provided with a suitable handle or connecting member 46 so that it may be operated contiguous to the steering wheel 32 or from a remote point by connecting another rod to said handle. The controlling rod 45 has an enlarged portion or cam 47 adapted to engage a clutch crank 48 and control the operation of the usual clutch associated with an internal combustion engine. The head 49 on the rod 45 is adapted for operating the brake band 44, and the inner end of said rod has suitable connections 50 to the carbureter 38, so that said carbureter, the clutch, and the brake can be controlled by simply reciprocating and turning the rod 45.

For changing the speed of the tractor through the usual change speed gear mechanism located within the casing 4, another rod 51 is located in parallelism with the steering column 31, and as bracing the frames 28 relative to the arms 6, there are radius rods 52.

From the foregoing, it will be observed that the arms 6 and the legs 7 coöperate in providing an inverted U-shaped hollow frame for supporting a power plant, and that within said hollow frame there are power transmitting devices so that the tractor wheels at the lower ends of the legs 7 may be driven from the power plant located intermediate the ends of the hollow frame. It will also be noted that the power plant is balanced relative to its supporting frame; that the operation of the machine can be easily controlled; that the steering mechanism is well housed; that the power transmitting devices are protected from dust and dirt, and that the machine as a whole can be advantageously used for field work.

I reserve the right to substitute other wheels for those shown, so that the machine may be operated on roads without injury to the same, and for moving the machine independent of any vehicle an ordinary pony wheel may be placed in position to support the end of the frames 28.

While in the drawing there is illustrated a preferred embodiment of my invention, it is to be understood that the structural elements are susceptible to such variations and modifications as fall within the scope of the appended claims.

What I claim is:—

1. A tractor comprising a hollow inverted U-shaped frame, a power plant centrally thereof, wheels at the ends of said frame, and means in said frame for transmitting power from said power plant to said wheels.

2. A tractor comprising an inverted U-shaped hollow frame, tractor wheels at the ends of said frame, a power plant intermediate the ends of said frame adapted to transmit power to said wheels, frames carried by said power plant, means supported by said frames adapted for steering said wheels, and means supported by said frames for controlling the operation of said power plant.

3. A tractor comprising a power plant, hollow arms projecting from the sides thereof, hollow legs depending from the ends of said arms, wheels at the lower ends of said legs, and means in said arms and said legs adapted to transmit power from said power plant to said wheels.

4. A tractor comprising a power plant, hollow arms projecting from the sides thereof, depending hollow legs carried by the outer ends of said arms, wheels at the lower ends of said legs, means on said legs adapted for steering said wheels, and means in said arms and said legs adapted for transmitting power from said power plant to said wheels.

5. The combination with a power plant, of hollow arms projecting from the sides thereof, depending hollow legs at the ends of said arms, housings at the lower ends of said legs, wheels at the outer sides of said housings, means extending through said arms, legs and housings adapted for imparting movement to said wheels from said power plant, and means on said legs adapted for turning said housings to steer said wheels.

6. In a tractor, a hollow inverted U-shaped frame, a power plant on said frame, housings at the ends of said frame, wheels at the outer sides of said housings, frames carried by said power plant, a steering mechanism supported from said frames and adapted for turning said housings to steer said wheels, and means on said frames for controlling the operation of said power plant.

In testimony whereof I affix my signature in the presence of two witnesses.

ALFRED C. JOHNSON.

Witnesses:
KARL H. BUTLER,
ANNA M. DORR.